No. 883,061. PATENTED MAR. 24, 1908.
J. W. TAYLOR.
VEHICLE BRAKE APPARATUS.
APPLICATION FILED MAY 23, 1907.
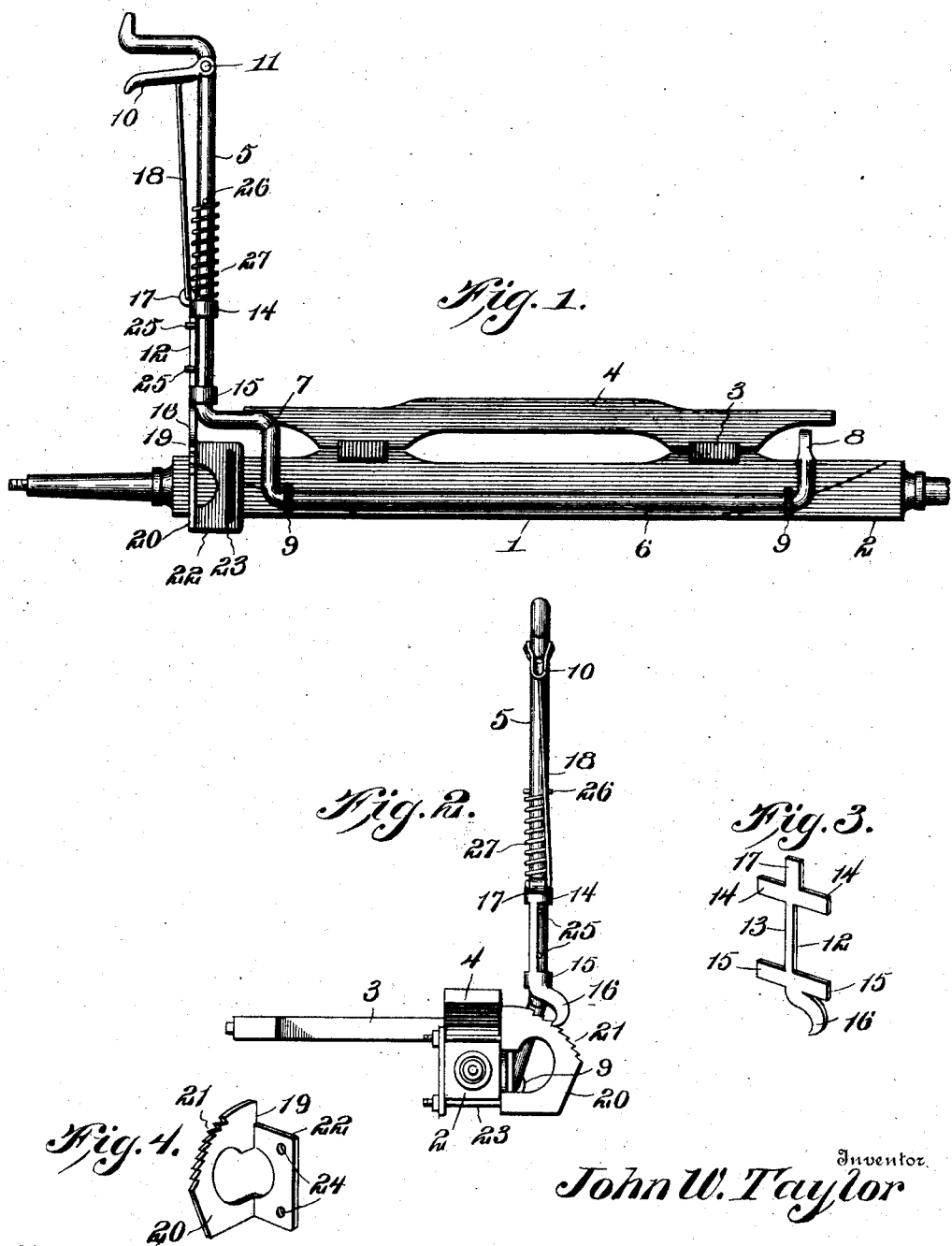
Inventor
John W. Taylor
Witnesses
Louis R. Heinrichs
J. W. Garner
By Victor J. Evans
Attorney

UNITED STATES PATENT OFFICE.

JOHN WESLEY TAYLOR, OF FULTON, KENTUCKY.

VEHICLE BRAKE APPARATUS.

No. 883,061.

Specification of Letters Patent.

Patented March 24, 1908.

Application filed May 23, 1907. Serial No. 375,292.

*To all whom it may concern:*

Be it known that I, JOHN WESLEY TAYLOR, a citizen of the United States of America, residing at Fulton, in the county of Fulton and State of Kentucky, have invented new and useful Improvements in Vehicle Brake Apparatus, of which the following is a specification.

This invention relates to improvements in vehicle brake apparatus, especially with reference to the provision of a brake lever, which is mounted directly on the front axle of the wagon; a segment bracket also attached to such front axle, and a dog mounted on the bracket lever for co-action with the segment arm of the bracket to lock such lever in adjusted position, and the said invention consists in the construction, combination and arrangement of devices hereinafter described and claimed.

In the accompanying drawing:—Figure 1 is an elevation of vehicle brake apparatus, showing the same attached to the front axle of the wagon. Fig. 2 is a side elevation of the same, showing one end of the axle. Fig. 3 is a detail perspective view of the blank from which the locking dog is formed. Fig. 4 is a similar view of the segment bracket.

The axle 1, is of the usual construction provided with the metal skeins 2 and with the usual hounds 3 and bolster 4. Each of the sections has an inwardly extending portion bearing under the axle and also bearing against the vertical sides thereof.

The bracket lever 5 is formed integrally with a rock shaft 6; a reëntrant angle 7 is formed between the inner end of the lever and one end of the said rock shaft and the opposite end of said rock shaft is bent at right angles to provide a rock arm 8, to which the usual brake rod is attached. The said rock shaft is mounted in bearings 9.

The trigger or finger piece 10 is pivotally connected as at 11 to the lever near the upper end of the latter, a rocking dog 12 being slidably mounted on the said lever; the said rocking dog is made of a single piece of plate metal which is initially formed from a blank, such as illustrated in Fig. 3, providing a shank 13, laterally extending arms, 14, similar lower arms 15 and a hook 16, the said arms 14 and 15 are bent to engage and slide upon the lever as shown in Fig. 1 and the upper end of the shank 13, which projects above the upper arms 14 and is bent outwardly to form an eye 17 to which is pivotally connected the lower end of an operating rod 18, the upper end of the said rod being attached to the trigger or finger piece 10. I also provide a segment bracket 19 which is shown in detail in Fig. 4. Such segment bracket comprises a segment wing or arm 20, ratchet teeth 21 and a wing or arm 22, which is disposed at right angles to said wing or arm 20, and is adapted to bear against one side of the angle. A V-shaped clip bolt 23 is provided, which passes through openings 24 in the wing or arm 22, and serves to rigidly yet detachably secure the said segment bracket to the axle.

It will be understood by reference to the drawing, that the hook of the pawl is adapted to engage the ratchet teeth of the segment to lock the lever at any desired adjustment. The lever is provided with projections 25, which extend from one side thereof and bear against one side of the shank or stem of the dog to prevent the latter from turning on the lever. A stop pin 26 passes through the lever and projects from opposite sides thereof and a coiled extensile spring 27 is placed on the said lever and bears between the said stop pin and the upper arms 14 of the dog and serves to force the dog downwardly to keep its hook normally in engagement with one of the ratchet teeth of the segment.

Having thus described my invention, I claim:—

1. An axle having a skein provided with an inwardly extending portion bearing under the axle and against the vertical sides thereof, a segment bracket comprising a wing bearing against one vertical side of the axle and said inner portion of the skein, said bracket further provided with a segment wing at right angles to the first mentioned wing, means securing the first mentioned wing of the bracket to the axle and a lever mounted on the axle and having a dog coacting with said segment wing.

2. In combination with a vehicle axle having a skein provided with an inwardly extending portion bearing under the axle and against the vertical sides thereof, a skein bracket comprising a vertical wing and a vertical segment wing at right angles thereto, the first mentioned wing of said bracket bearing against one vertical side of the axle and one vertical side of the inwardly extending portion of the skein, a clip bolt securing said wing, axle and axle skein together, a lever mounted on the axle and a dog carried by said lever and coacting with the segment wing of the bracket.

In testimony whereof, I affix my signature in presence of two witnesses.

JOHN WESLEY TAYLOR.

Witnesses:
C. F. DAHNKE,
SELDON COHN.